US008089027B2

(12) United States Patent
Newman et al.

(10) Patent No.: US 8,089,027 B2
(45) Date of Patent: Jan. 3, 2012

(54) LASER WELDING OF CONDUCTIVE COATED METALLIC BIPOLAR PLATES

(75) Inventors: Keith E Newman, Pittsford, NY (US); Michael K Budinski, Pittsford, NY (US); Brian K Brady, North Chili, NY (US)

(73) Assignee: GM Global Technology Operations LLC

( * ) Notice: Subject to any disclaimer, the term of this patent is extended or adjusted under 35 U.S.C. 154(b) by 1104 days.

(21) Appl. No.: 10/842,788

(22) Filed: May 11, 2004

(65) Prior Publication Data

US 2005/0252892 A1 Nov. 17, 2005

(51) Int. Cl.
*B23K 26/00* (2006.01)
(52) U.S. Cl. .......... 219/121.64; 219/121.66; 219/121.65
(58) Field of Classification Search ............ 219/121.64, 219/121.66, 121.65, 121.85
See application file for complete search history.

(56) References Cited

U.S. PATENT DOCUMENTS

| | | | | |
|---|---|---|---|---|
| 3,522,095 A * | 7/1970 | Baker, Jr. et al. | ............... | 429/30 |
| 5,858,567 A * | 1/1999 | Spear et al. | ..................... | 429/12 |
| 6,372,376 B1 | 4/2002 | Fronk et al. | | |
| 6,828,054 B2 * | 12/2004 | Appleby et al. | ................ | 429/34 |
| 6,989,213 B2 | 1/2006 | Kaiser et al. | | |
| 2004/0072053 A1 * | 4/2004 | Schlag | ........................... | 429/36 |
| 2004/0142224 A1 * | 7/2004 | Abd Elhamid et al. | ......... | 429/35 |
| 2004/0170883 A1 * | 9/2004 | Bartholomeyzik et al. | ..... | 429/36 |
| 2006/0054664 A1 | 3/2006 | Strobel et al. | | |

FOREIGN PATENT DOCUMENTS

| | | |
|---|---|---|
| DE | 10017200 | 10/2001 |
| DE | 10221951 A1 | 12/2003 |
| DE | 10301052 A1 | 7/2004 |

OTHER PUBLICATIONS

ASM Handbooks Online, v.18, Friction, Lubrication and Wear Technology, Laser Surface Preparation, Laser Cladding.*

* cited by examiner

*Primary Examiner* — M. Alexandra Elve
(74) *Attorney, Agent, or Firm* — Harness, Dickey & Pierce, P.L.C.

(57) ABSTRACT

The present invention discloses a method of efficiently manufacturing fuel cells having coated bipolar plates. The present invention contemplates the laser welding together of individual plates already having a coating thereon to form the bipolar plates that are used in a fuel cell. The laser welding of the coated plates together does not result in sensitization of the plates to a magnitude sufficient to cause an undesirable level of corrosion resistance. This result is achieved regardless of the presence of the organic coating in the region of the plates being welded and regardless of the ablating of the organic coating by the laser beam.

25 Claims, 7 Drawing Sheets

LASER WELDING OF CONDUCTIVE COATED METALLIC BIPOLAR PLATES

FIELD OF THE INVENTION

The present invention relates to fuel cells and more particularly to coated metallic plates that are laser welded together to form a bipolar plate of a fuel cell.

BACKGROUND OF THE INVENTION

Fuel cells have been proposed as a power source for electric vehicles and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The anode and cathode typically comprise finely divided carbon particles, very finely divided catalytic particles supported on the internal and external surfaces of the carbon particles, and proton conductive material intermingled with the catalytic and carbon particles. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

PEM fuel cells comprise a plurality of the MEAs stacked together in electrical series while being separated one from the next by an impermeable, electrically conductive contact element known as a bipolar plate or current collector. The current collector or bipolar plate has two working surfaces, one confronting the anode of one cell and the other confronting the cathode on the next adjacent cell in the stack, and electrically conducts current between the adjacent cells. Contact elements at the ends of the stack contact only the end cells and are referred to as end plates. In some types of fuel cells each bipolar plate is comprised of two separate plates that are attached together with a fluid passageway therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the two plate bipolar plates. The bipolar plates are formed by aligning a pair of individual plate halves adjacent one another and suitably bonding the plates together, thus providing electrical conductivity.

Contact elements are often constructed from electrically conductive metallic materials. In an $H_2$ and $O_2$/air PEM fuel cell environment, the bipolar plates and other contact elements (e.g., end plates) are in constant contact with moderately acidic solutions (pH 3-5) and operate in a highly oxidizing environment, being polarized to a maximum of about +1 V (vs. the normal hydrogen electrode). On the cathode side the contact elements are exposed to pressurized air, and on the anode side exposed to atmospheric hydrogen. Unfortunately, many metals are susceptible to corrosion in the hostile PEM fuel cell environment, and contact elements made therefrom either dissolve (e.g., in the case of aluminum), or form highly electrically resistive, passivating oxide films on their surface (e.g., in the case of titanium or stainless steel) that increases the internal resistance of the fuel cell and reduces its performance.

To reduce the electrical contact resistance of the metallic bipolar plates, the exposed surfaces of each plate are overlaid with an electrically conductive, coating which also restricts contact between the plate surface and the corrosive environment of the fuel cell. Frequently the coating is an organic binder incorporating electrically conducting organic particles, such as carbon or graphite (i.e., hexagonally crystallized carbon).

Currently, the two-plate bipolar plate halves are coated after the two individual plates have been joined together. This method of coating the bipolar plates, however, is time consuming and limits the mass production of fuel cells using such coated plates. Thus, it would be desirable to coat the bipolar plates in a less time consuming manner that facilitates mass production of fuel cells.

SUMMARY OF THE INVENTION

The present invention discloses a method of efficiently manufacturing fuel cells having coated bipolar plates. The present invention contemplates the laser welding together of individual metallic plates already having a conductive coating thereon to form the bipolar plates that are used in a fuel cell. Such a method has heretofore not been considered due to the organic component of the coating. Specifically, metallic bipolar plates are typically made from stainless steel which when exposed to carbon from an organic coating in a welding process can cause the exposed regions to be sensitized and less corrosion resistant. The primary component of stainless steel which imparts corrosion resistance is Chromium. If stainless steel is exposed to carbonaceous materials during high temperature processing (e.g., near or above it's melting point), carbon will combine with Chromium in the metal. This reduces the amount of Chromium available for use in creating passive oxide surface films that afford the metal it's corrosion resistant properties. The reduction in alloy corrosion resistance results in evolution of ferrous and ferric ions which contaminate the polymer membrane and reduce its' mechanical durability as well as its' hydrogen ion transport efficiency. Thus, the sensitization of the plates is undesirable as the useful life of the plates is reduced. Therefore, the typical manufacturing process is to clean the surfaces of the plates to remove any organic contaminates prior to welding, thus preventing the coating of the plates prior to welding. The removal of all organic contaminates prior to welding thereby prevents sensitizing the plates and avoids the associated reduction in corrosion resistance. The inventors of the present invention, however, have discovered that the laser welding of the coated plates together does not result in sensitization of the plates to a magnitude sufficient to cause an undesirable level of corrosion resistance. This result is achieved regardless of the presence of the organic coating in the region of the plates being welded and regardless of the ablating of the organic coating by the laser beam.

In one aspect of the present invention a method is disclosed for making a fuel cell stack having at least two metallic members that are attached together with at least one of the metallic members having an electrically conductive coating thereon. The method includes: (1) positioning a first metallic member adjacent a second metallic member, the first metallic member having a first electrically conductive coating thereon; (2) melting a portion of the adjacent metallic members; and (3) solidifying the melted portions of the adjacent metallic members thereby forming a fusion bond between the adjacent metallic members.

In another aspect of the present invention, a method is disclosed for making a fuel cell stack having metallic bipolar plates with an internal flow passageway. The method includes: (1) positioning a first metallic plate having at least a portion of one surface coated with an electrically conductive coating adjacent a second metallic plate with the coated portion facing away from the second plate; (2) applying focused radiation to portions of the adjacent plates including portions of the coating thereby ablating the portions of the coating and melting the portions of the adjacent plates; (3) removing the focused radiation; and (4) allowing the melted portions to solidify and fuse together thereby forming one of the bipolar plates.

In yet another aspect of the present invention, a method of making a bipolar plate for a fuel cell stack is disclosed. The method includes: (1) applying an electrically conductive organic coating to a first metallic plate of the bipolar plate; (2) positioning the first plate adjacent a second metallic plate of the bipolar plate; (3) applying focused radiation to portions of the adjacent plates including portions of the coating thereby ablating the portions of the coating and melting the portions of the adjacent plates; (4) removing the focused radiation; and (5) allowing the melted portions to solidify and fuse together thereby forming the bipolar plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

The present invention relates to a PEM fuel cell having at least one metallic bipolar plate that is made from two individual plates and disposed between a pair of MEAs. The individual plates each have an electrically conductive, protective coating that restricts contact of the surfaces of the plates with the corrosive environment of the fuel cell. The two coated individual plates are joined together by laser welding which causes the coating proximate the welding region to be ablated. A second coating may be applied to the welded region, if desired.

Figure 1:
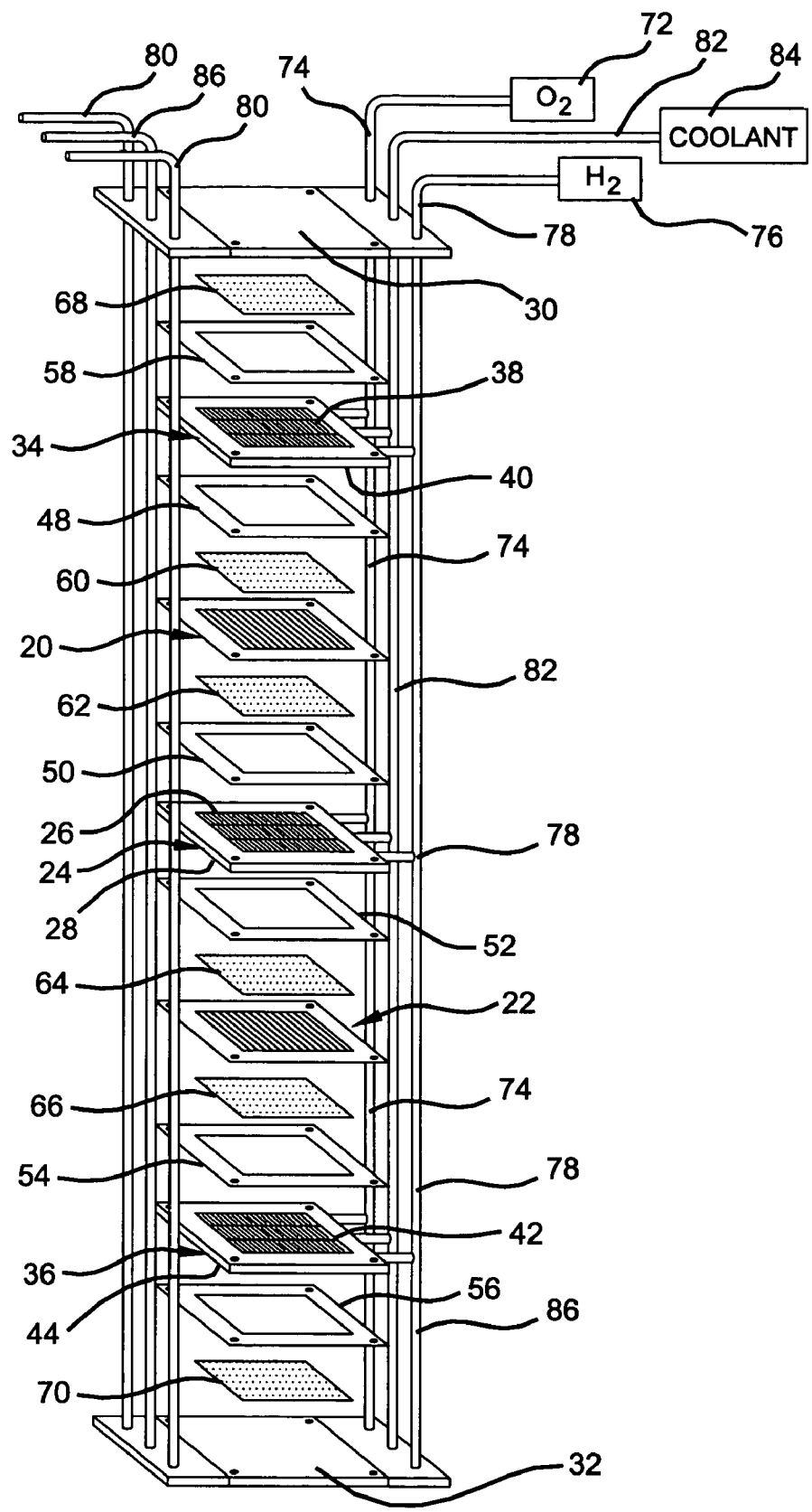
FIG. 1 is a schematic, exploded, isometric, illustration of a liquid-cooled PEM fuel cell stack (only two cells shown)

To gain a better understanding of the present invention, an exemplary fuel cell where the present invention may be employed is shown in FIG. 1, which depicts two individual proton exchange membrane (PEM) fuel cells connected to form a stack having a pair of membrane-electrode-assemblies (MEAs) 20, 22 separated from each other by an electrically conductive, liquid-cooled, bipolar separator plate conductive element 24. An individual fuel cell, which is not connected in series within a stack, has a separator plate 24 with a single electrically active side. In a stack, a preferred bipolar separator plate 24 typically has two electrically active sides 26, 28 within the stack, each active side 26, 28 respectively facing a separate MEA 20, 22 with opposite charges that are separated, hence the so-called "bipolar" plate.

The MEAs 20, 22 and bipolar plate 24 are stacked together between aluminum clamping terminal plates 30, 32 and end contact fluid distribution elements 34, 36. The end fluid distribution elements 34, 36, as well as both working faces or sides 26, 28 of the bipolar plate 24, contain a plurality of lands adjacent to grooves or channels on the active faces 38, 40, 26, 28, 42, and 44 for distributing fuel and oxidant gases (i.e., $H_2$ and $O_2$) to the MEAs 20, 22. Nonconductive gaskets or seals 48, 50, 52, 54, 56, and 58 provide seals and electrical insulation between the several components of the fuel cell stack. Gas-permeable conductive diffusion media 60, 62, 64, and 66 press up against the electrode faces of the MEAs 20, 22. Additional layers of conductive media 68, 70 are placed between the end contact fluid distribution elements 34, 36 and the terminal collector plates 30, 32 to provide a conductive pathway therebetween when the stack is compressed during normal operating conditions. The end contact fluid distribution elements 34, 36 press up against the diffusion media 60, 68 and 66, 70 respectively.

Oxygen is supplied to the cathode side of the fuel cell stack from either a storage tank or compressor 72 via appropriate supply plumbing 74, while hydrogen is supplied to the anode side of the fuel cell from storage tank 76, via appropriate supply plumbing 78. Alternatively, air may be supplied to the cathode side from the ambient, and hydrogen to the anode from a methanol or gasoline reformer, or the like. Exhaust plumbing 80 for both the $H_2$ and $O_2$/air sides of the MEAs is also provided. Additional plumbing 82 is provided for circulating coolant from a storage area 84 through the bipolar plate 24 and end plates 34, 36 and out the exit plumbing 86.

Figure 2:
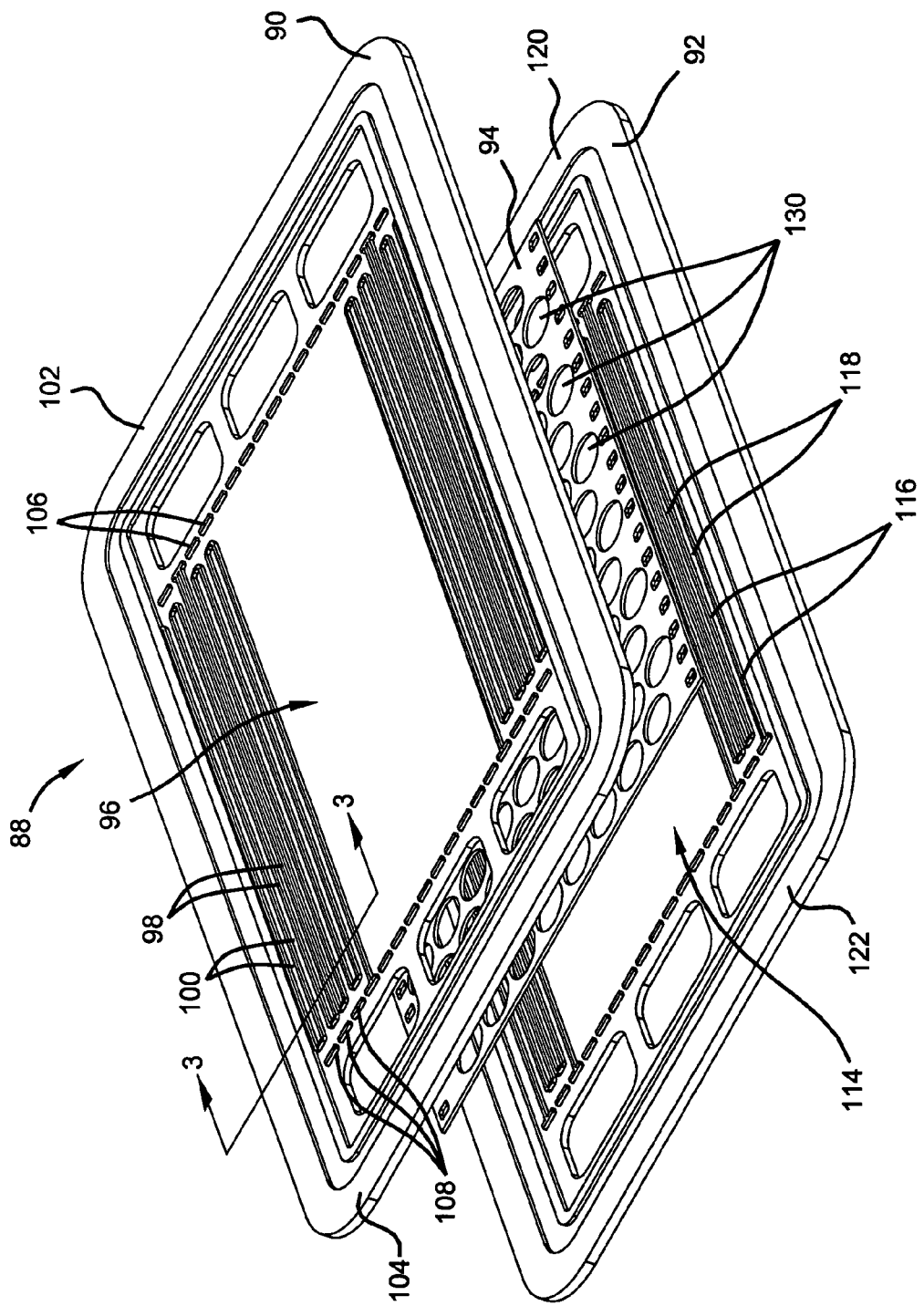
FIG. 2 is an exploded, isometric view of a bipolar plate useful with PEM fuel cell stacks like that illustrated in FIG. 1.

FIG. 2 is an isometric, exploded view of a bipolar plate 88 comprising a first exterior metal sheet 90, a second exterior metal sheet 92, and an interior spacer metal sheet 94 disposed between the first metal sheet 90 and second metal sheet 92. The exterior metal sheets 90, 92 are made as thin as possible (e.g., about 0.002-0.02 inches thick), which may be formed by stamping, by electroforming, or any other conventional process for shaping sheet metal. The external sheet 90 has a first working surface 96 on the outside thereof which confronts a membrane-electrode-assembly (not shown) and is formed so as to provide a plurality of lands 98 which define therebetween a plurality of grooves 100 known as a "flow field" through which the fuel cell's reactant gases (i.e., $H_2$ or $O_2$) flow in a tortuous path from one side 102 of the bipolar plate to the other side 104 thereof. When the fuel cell is fully assembled, the lands 98 press against the carbon/graphite papers (such as 62 or 64 in FIG. 1) which, in turn, press against the MEAs (such as 20 or 22 in FIG. 1, respectively). For drafting simplicity, FIG. 2 depicts only two arrays of lands 98 and grooves 100. In reality, the lands and grooves 98, 100 will cover the entire external surfaces of the metal sheets 90, 92 that engage the carbon/graphite papers. The reactant gas is supplied to grooves 100 from a header or manifold groove 106 that lies along one side 102 of the fuel cell, and exits the grooves 100 via another header/manifold groove 108 that lies adjacent the opposite side 104 of the fuel cell.

Figure 3:
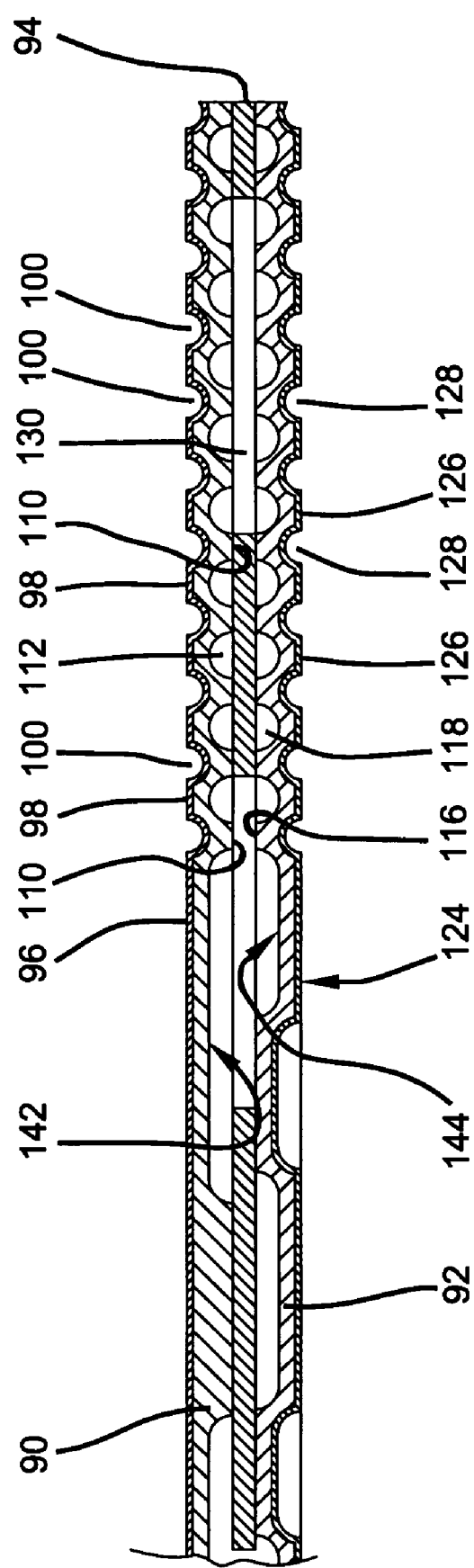
FIG. 3 is a partial cross-sectional view in the direction 3-3 of FIG. 2.

As best shown in FIG. 3, the underside of the sheet 90 includes a plurality of ridges 110 which define therebetween a plurality of channels 112 through which coolant passes during the operation of the fuel cell. As shown in FIG. 3, a coolant channel 112 underlies each land 98 while a reactant gas groove 100 underlies each ridge 110. Alternatively, the sheet 90 could be flat and the flow field formed in a separate sheet of material. Metal sheet 92 is similar to sheet 90. The internal surface 114 (i.e., coolant side) of sheet 92 is shown in FIG. 2.

In this regard, there is depicted a plurality of ridges 116 defining therebetween a plurality of channels 118 through which coolant flows from one side 120 of the bipolar plate to the other 122. Like sheet 90 and as best shown in FIG. 3, the external side of the sheet 92 has a working surface 124 having a plurality of lands 126 thereon defining a plurality of grooves 128 through which the reactant gases pass. Interior metal spacer sheet 94 is positioned between the exterior sheets 90, 92 and includes a plurality of apertures 130 therein to permit coolant to flow between the channels 118 in sheet 92 and the channels 112 in the sheet 90 thereby breaking laminar boundary layers and affording turbulence which enhances heat exchange with inside surfaces 142, 144 of the exterior sheets 90, 92 respectively.

Figure 4:
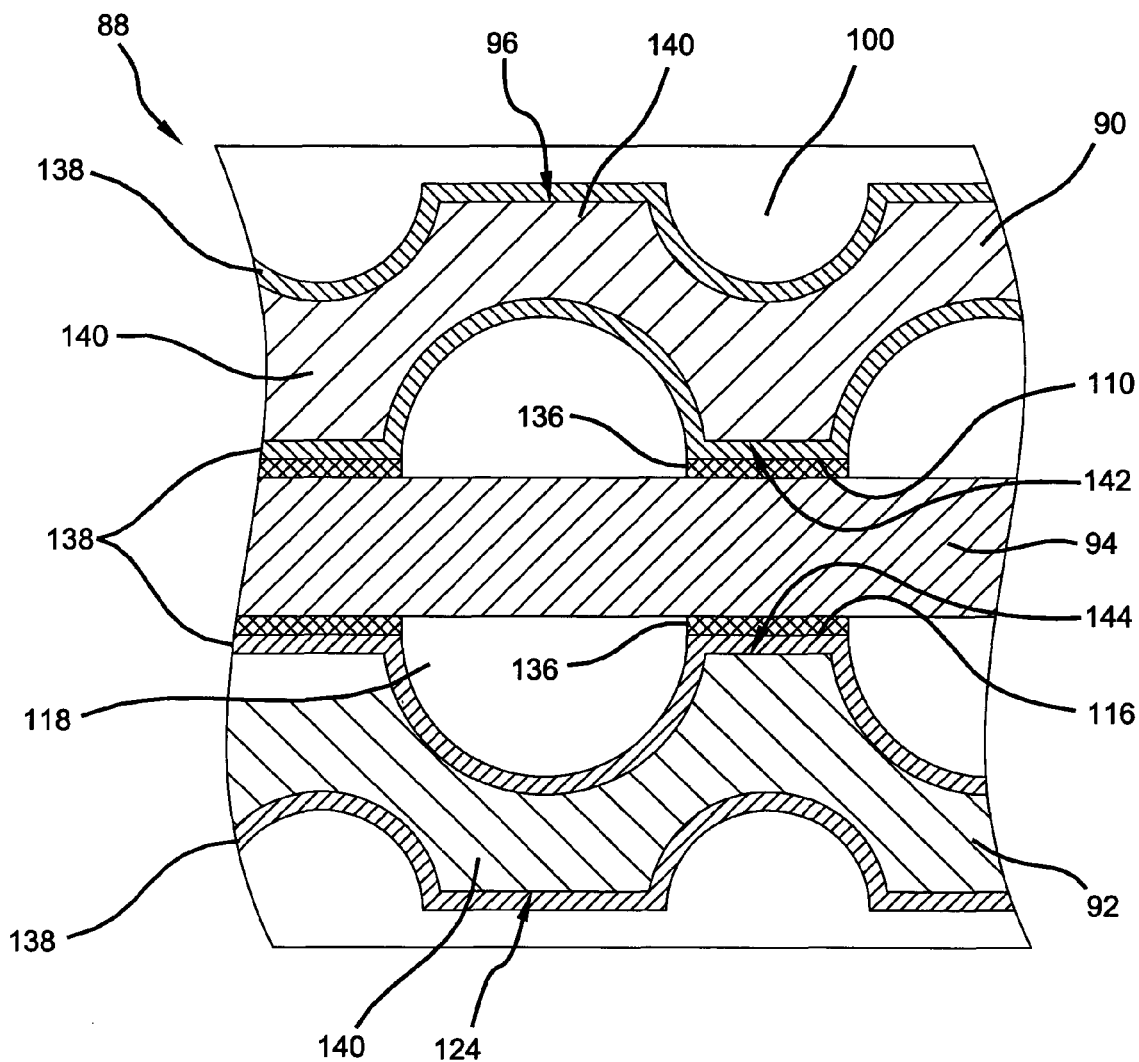
FIG. 4 is a magnified portion of the bipolar plate of FIG. 3.

The spacer sheet 94 is positioned between the first sheet 90 and second sheet 92, where the ridges 110 on the first sheet 90 and the ridges 116 on the second sheet 92 are bonded (e.g. by a bonding layer 136, such as brazement or adhesives as shown in FIG. 4) to the spacer sheet 94. As recognized by one of skill in the art, the current collectors of the present invention may vary in design from those described above, such as for example, in the configuration of flow fields, placement and number of fluid delivery manifolds, and the coolant circulation system, however, the function of conductance of electrical current through the surface and body of the current collector functions similarly between all designs.

Stainless steel is generally defined as an iron-chromium alloy with a minimum of 9% chromium. Other ferritic, martensitic, or austenitic alloys are contemplated for use in PEM fuel cells. Stainless steels rich in chromium (i.e., at least 16% by weight), nickel (i.e., at least 10% by weight), and molybdenum (i.e., at least 3% by weight) are particularly desirable metals for use within a fuel cell, due to their relatively high bulk electrical conductivity and corrosion resistance provided by a passivation (i.e., metal oxide) layer at the surface. Thin stainless steel plates can be used to increase the volumetric and weight power density of the fuel cell stack. Further, stainless steel materials have relatively high strength, physical durability, adherence by protective coatings, and are less expensive than many other conductive metal alternatives. However, the oxide layer at the surface increases electrical contact resistance of the substrate, which has previously prevented its independent use as an electrical contact element or current collector. Further many other relatively lightweight metals are susceptible to corrosive attack (e.g., aluminum and magnesium), and in light of such corrosion sensitivity and similar propensity for oxidation, various protective coatings are used for the metal substrate.

Hence, an electrically conductive element or current collector made of a corrosion-susceptible metal is treated to impart a low contact resistance and the ability to withstand corrosion and oxidative attack. Such a treatment permits the use of metals, such as stainless steel, which previously had too high of an electrical contact resistance for practical use in a fuel cell. Thus, for a preferred embodiment, the metal substrate is stainless steel, such as for example 316L (UNS S31603), an alloy which contains iron, chromium, nickel, and molybdenum. The electrically conductive element is preferably protected from further corrosion/passivation by physically protecting it from corrosive agents to prevent the reformation of a passivation layer at the surface of the metal substrate. As shown in FIG. 4, the electrically conductive element (e.g. bipolar plate 88) has a protective coating 138 overlaying the metal substrate 140 on both the first surface 96 of the first sheet 90 and the second surface 124 of the second sheet 92. Further, the protective coating 138 is applied to the interior first surface 142 of the first sheet 90 and second surface 144 of the second sheet 92, to protect the substrate 140 from corrosive oxidative attack by the coolant. From a practical point of view, it is not necessary to coat the interior or coolant passages of the bipolar plate in the case of stainless steel or titanium applications. The protective coating 138 is a practical way to isolate the electrically conductive element from corrosive agents that are prevalent both in the processing environment and in the fuel cell itself. Thus, it is preferred that the protective coating 138 is applied to the conductive and corrosion-susceptible regions (e.g. surfaces 96, 124, 142, 144) of the electrically conductive element 88, such that the underlying metal substrate 140 is protected from corrosive agents that would react with the metal to electrically inactivate/passivate each surface. Thus, select regions may include only the electrically conductive areas that form conductive pathways across the electrically conductive element or such regions may coincide to the entire surface of the substrate.

The protective coatings 138 can take a variety of forms, such as those disclosed in U.S. Pat. No. 6,372,376 entitled "Corrosion Resistant PEM Fuel Cell," and assigned to the Assignee of the present invention, the disclosure of which is incorporated by reference herein. The protective coatings 138 are preferably corrosion resistant electrically conductive coatings, that protect the underlying metal substrate 140 from exposure to corrosion agents. More specifically, the protective coatings 138 preferably have an interfacial electrical contact resistance less than about 50 ohm-cm$^2$ ($\Omega$-cm$^2$) and comprise a plurality of oxidation-resistant, acid-insoluble, conductive particles (i.e., on the order of about 50 microns or less than about 50 microns) dispersed throughout an acid-resistant, oxidation-resistant polymer matrix, where the polymer binds the particles together and holds them on the surface of the metal substrate 140. The coating contains sufficient conductive filler particles to produce a total interfacial electrical contact resistance no greater than about 50 ohm-cm$^2$ and has a thickness between about 2 microns and about 75 microns, preferably between 2 and 30 microns, depending on the composition, resistivity and integrity of the coating. Thinner coatings (i.e., about 15-25 microns) are most preferred for minimizing ohmic losses in the stack. Impervious protective coatings 138 are preferred to protect the underlying metal substrate 140 surface from permeation of corrosive agents.

Preferably, the conductive filler particles are selected from the group consisting of gold, platinum, graphite, carbon, nickel, conductive metal borides, nitrides and carbides (e.g. titanium nitride, titanium carbide, titanium diboride), titanium alloyed with chromium and/or palladium, niobium, rhodium, rare earth metals, and other noble metals. Most preferably, the particles will comprise carbon or graphite (i.e., hexagonally crystallized carbon). The particles comprise varying weight percentages of the coating depending on the density and conductivity of the particles (i.e., particles having a high conductivity and low density can be used in lower weight percentages). Carbon/graphite containing coatings will typically contain 25 percent by weight carbon/graphite particles. The polymer matrix comprises any polymer that can be formed into a thin adherent film and that can withstand the hostile oxidative and acidic environment of the fuel cell. Hence, such polymers as epoxies, silicones, polyamide-imides, polyether-imides, polyphenols, fluro-elastomers, polyesters, phenoxy-phenolics, epoxide-phenolics, acrylics, and urethanes, inter alia are seen to be useful. Both thermoset and thermoplastic polymers are suitable for producing impermeable coatings.

The conductive polymer coating 138 can be applied directly to the substrate metal 140 and allowed to dry/cure thereon. The coating 138 may be applied in a variety of ways, and examples of such methods are described in detail in U.S. Pat. No. 6,372,376 to Fronk et al. and may include (1) electrophoretic deposition, (2) brushing, spraying or spreading, or (3) laminating. The coatings can be adapted for use in continuous manufacturing process such as coil coating.

Figure 5:
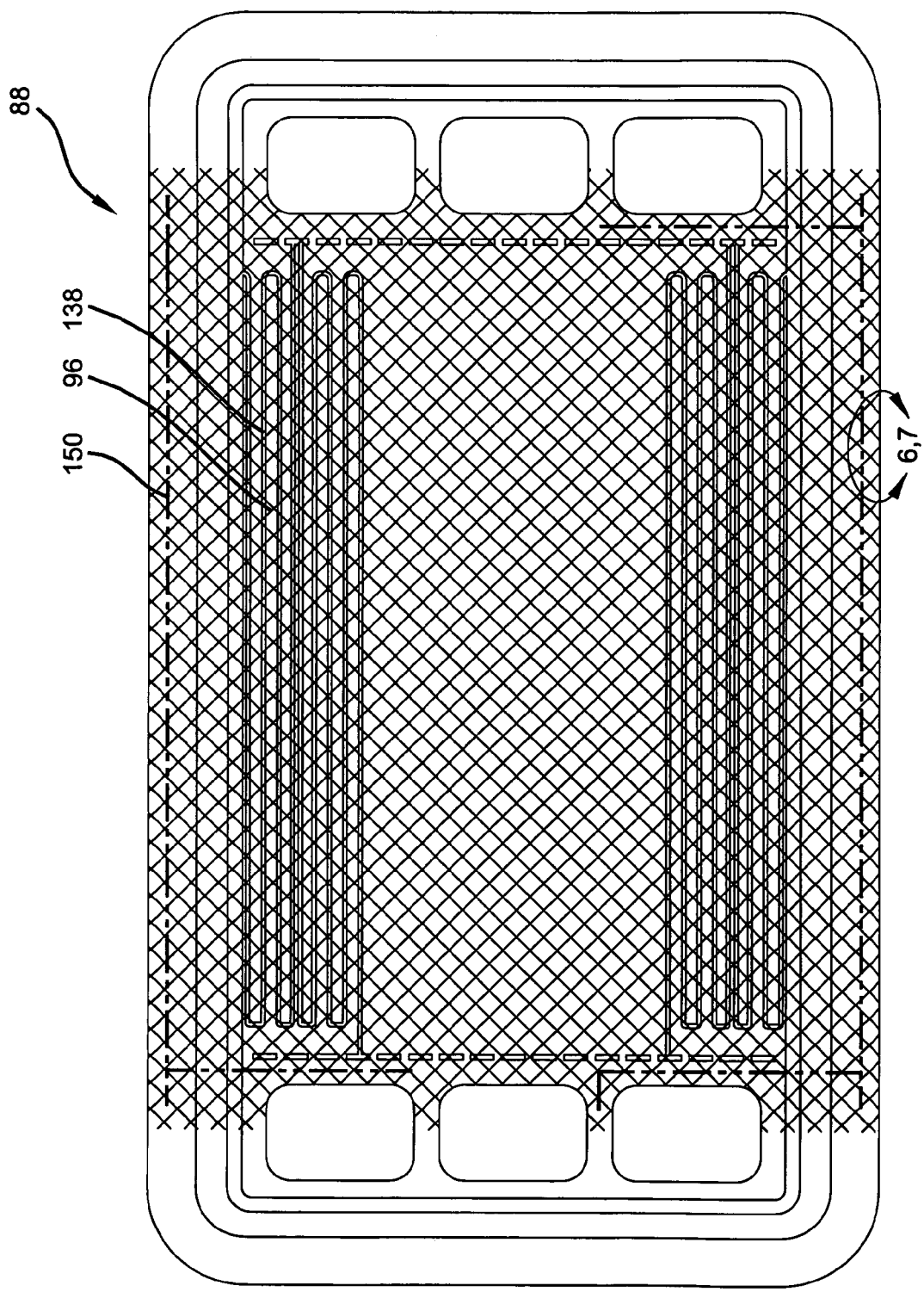
FIG. 5 is a plan view of the bipolar plate of FIG. 2 with some welding areas indicated.

As stated above, bipolar plate 88 is made by attaching sheets 90, 92 together by welding portions of sheets 90, 92 together with focused radiation, such as laser welding. For example, a plan view of first surface 96 of plate 90 of bipolar plate 88 is shown in FIG. 5 with some of the regions of bipolar plate 88 that are laser welded together illustrated by broken line 150 and the portions of bipolar plate 88 that are overlaid with coating 138 are shaded. It should be appreciated that welding line 150 is representative of the possible locations for welding bipolar plate 88 and that the exact locations of welding bipolar plate 88 together will vary depending upon the design of the sheets 90, 92 and the addition of other components, such as spacer sheet 94, that form bipolar plate 88.

Figure 6A:
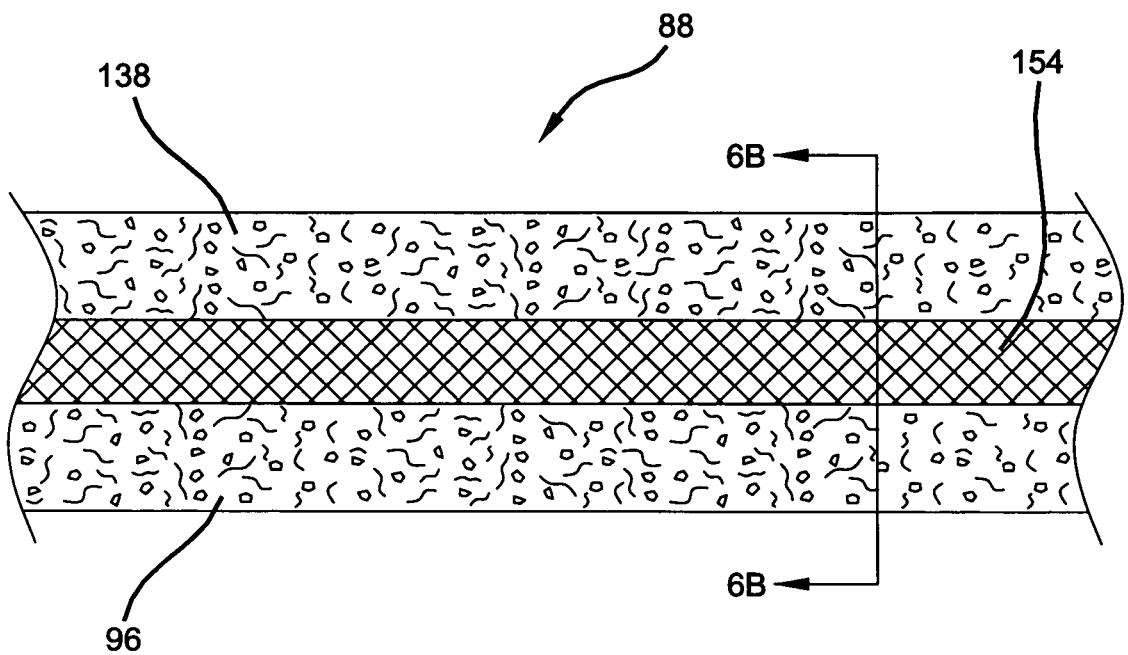
FIG. 6A is a close-up of a laser welded region of the bipolar plate of FIG. 5.
Figure 6B:
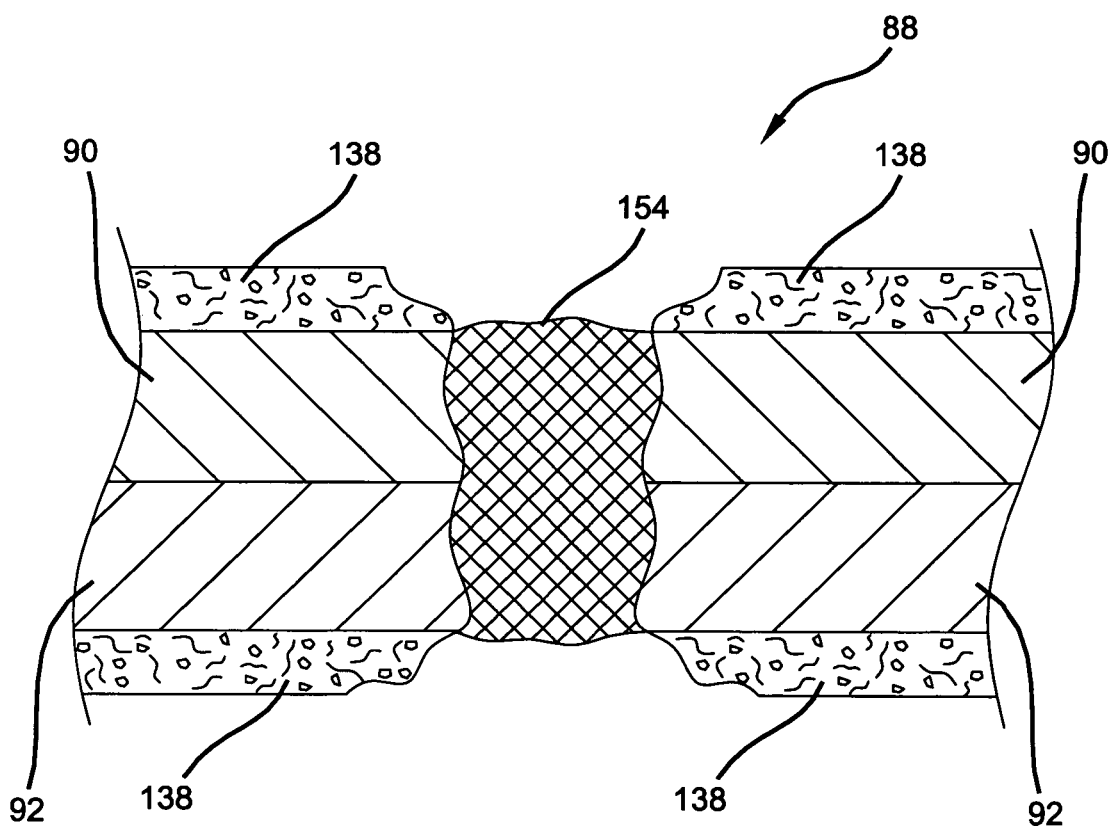
FIG. 6B is a cross-sectional view of the laser welded region of the bipolar plate of FIG. 6A along line 6B-6B.

The regions 150 of bipolar plate 88 that are welded together includes regions that are overlaid with coating 138, such as the magnified portion of bipolar plate 88 shown in FIG. 6A. When welding first and second sheets 90, 92 together, the focused radiation causes the portions of first and second sheets 90, 92 that come in contact with the focused radiation to melt. Upon removal of the focused radiation, the melted portions of first and second sheets 90, 92 solidify and are thereby fused together as indicated in fused portion 154 shown in FIGS. 6A and 6B. The welding process can form a through weld wherein the weld extends all the way through the first and second sheets 90, 92. Specifically, as shown in FIG. 6B, the fused portion 154 extends from a top surface of first sheet 90 all the way through to a bottom surface of second sheet 92 thereby forming a through weld. Additionally, the focused radiation also ablates the portions of coating 138 that are in direct contact with the focused radiation and proximate fused portion 154 of bipolar plate 88 as best seen in FIG. 6B.

The ablation of coating 138 from the surfaces of bipolar plate 88, as discussed below in example 1, does not significantly affect the corrosion resistance of first and second sheets 90, 92, That is, when coating 138 is an organic coating and bipolar plate 88 is made from stainless steel sheets 90, 92, the contact of the organic components of coating 138 with first and second sheets 90, 92 during the welding of first and second sheets 90, 92 together with focused radiation does not sensitize the stainless steel to a degree that detrimentally effects the corrosion resistance of the stainless steel sheets. This capability enables first and second sheets 90, 92 to be overlaid with coating 138 prior to being welded together to form bipolar plate 88. This capability provides significant advantages in that first and second sheets 90, 92 can be formed from a pre-coated roll of stock metal. In other words, the stock metal from which first and second sheets 90, 92 are formed can be overlaid with coating 138 during the manufacture of the stock sheet material, such as coil coating, or at some time thereafter. First and second sheets 90, 92 can then be formed out of the stock coated sheet material in an economical and continuous manner, such as by stamping, electro-forming or any other conventional process for shaping sheet metal and then positioned adjacent one another and welded together to form bipolar plate 88. Thus, the present invention contemplates an economical and efficient method of manufacturing bipolar plates for use in a fuel cell.

Figure 7A:
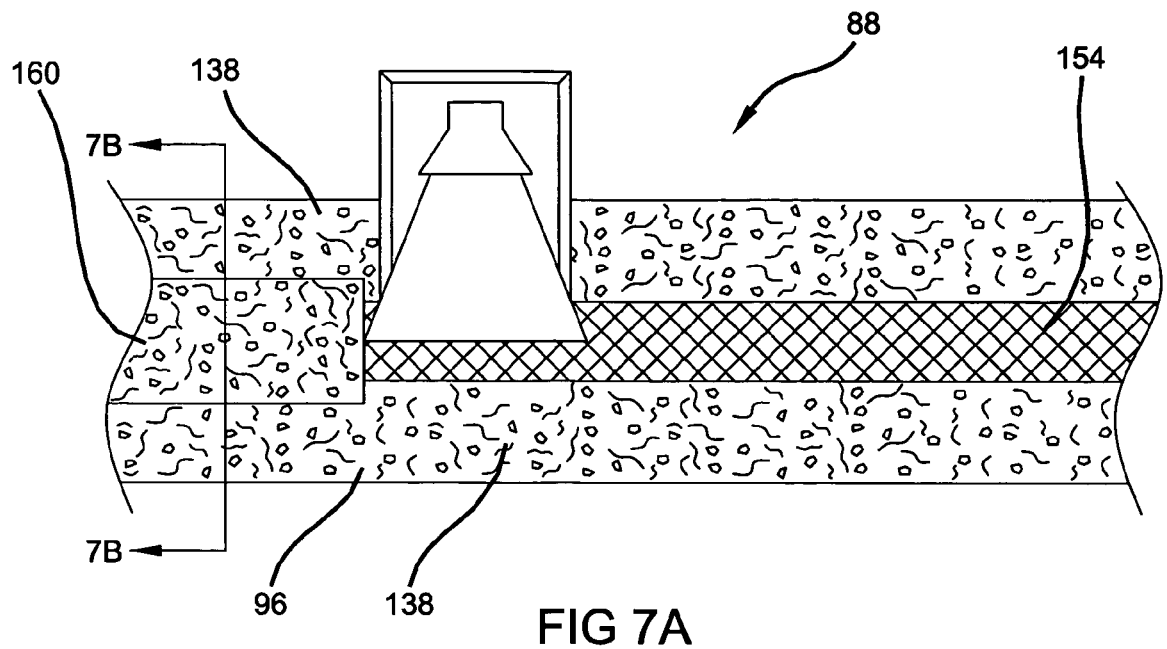
FIG. 7A is a close-up of the laser welded region of FIG. 6A showing the application of a second coating over the laser welded region.
Figure 7B:
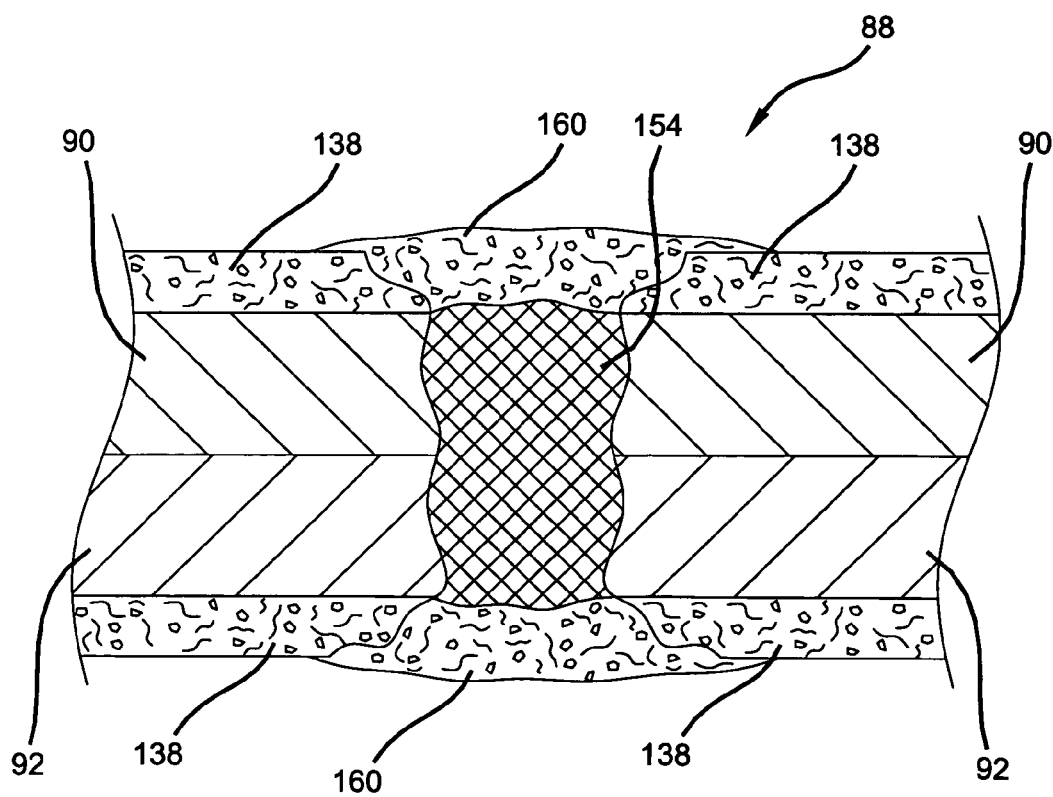
FIG. 7B is a cross-sectional view of the recoated laser welded region of FIG. 7A along lines 7B-7B.

If desired, after welding first and second sheets 90, 92 together, a second protective coating 160 can be applied over the ablated regions of coating 138, as shown in FIG. 7A. The application of second coating 160, as shown in FIG. 7B, results in the fused portion 154 of sheets 90, 92 being overlaid and protected by second protective coating 160. Second protective coating 160 can be applied in a variety of manners. For example, second protective coating 160 can be applied by spraying, as shown, brushing or spreading. Preferably, second coating 160 is the same as coating 138. However, it should be appreciated that second coating 160 can be a different protective coating than that used for coating 138. Furthermore, second coating 160 can be selectively applied to discrete regions of the welded portions of bipolar plate 88, as desired.

The welding of first and second sheets 90, 92 together to form bipolar plate 88 via focused radiation can take a variety of forms. For example, laser welding, such as Nd-YAG or $CO_2$ lasers can be used to weld first and second sheets 90, 92 together. The specific type of laser chosen will depend upon the required spectral range, energy density and beam diameter for welding first and second sheets 90, 92 together. Additionally, other components of bipolar plate 88 can be welded together with first and second sheets 90, 92 when forming bipolar plate 88. For example, portions of spacer sheet 94 may reside within regions where first and second sheets 90, 92 are welded together and also be melted by the focused radiation beam and form part of the fused portion of bipolar plate 88. The other components of bipolar plate 88 that are welded together with first and second metal sheets 90, 92 are not limited to spacer sheet 94. Other components could include such things as sensors, valves, etc., that may be required to be fixedly attached inside or outside of bipolar plate 88, it may even be possible to weld adjacent bipolar plates 88 together through an MEA that is disposed therebetween. In this case, the fused portion can extend all the way through the MEA along with first and second sheets 90, 92, in a manner similar to that shown in FIG. 6B.

EXAMPLE 1

Various laser welds on conductive carbon coated stainless steel plates were tested by Cross Section Examination and oxalic acid etching via ASTM standards and by Woodcock Corrosion Testing. The Cross Section Examination produced no evidence of sensitization occurring in the stainless steel plates. In the Woodcock Corrosion Testing, there was some attack of the welds, however, there was no evidence of detrimental sensitization occurring in the stainless steel plates. The details of the testing of the stainless steel plates are shown in the table below.

TABLE

| | |
|---|---|
| Tests | Woodcock Corrosion Test and Cross Section Examination |
| Sample Material | 316L Stainless Steel 0.15 mm in thickness |
| # of Laser Welds | 20 |

TABLE-continued

| Tested | |
|---|---|
| Type of Laser | Nd: YAG |
| Organic Coating | Carbon-filled organic coating, such as described in U.S. Pat. No. 6,372,376 B1 |
| Solution | 18% Nitric Acid 11% HF Acid 71% $H_2O$ |
| Temperature | 140° F. |
| Duration | 2 hours |

Thus, the present invention allows bipolar plates 88 to be economically and efficiently produced by using pre-coated stock material to form sheets that are then welded together to form the bipolar plates. The existence of a coating on the sheets prior to welding does not affect the ability of the sheets to maintain a sufficient level of corrosion resistance. The coatings can be organic and/or inorganic and the sheets can include stainless steel and a variety of other materials as discussed above. Additionally, the coating can be located on just an external surface (current conducting surfaces) of plates 90, 92 and/or on both the internal and external surfaces of the plates. Additionally, more than two layers or metallic plates having various coatings thereon can be laser welded together according to the principles of the present invention. Additionally, a seal or gasket (not shown) can be positioned on one or more of the surfaces of the bipolar plate over top of the welded areas and bound to the plate by adhesives or overmolding.

Thus, it should be appreciated that the description of the invention is merely exemplary in nature and variations that do not depart from the gist of the invention are intended to be within the scope of the invention. Such variations are not to be regarded as a departure from the spirit and scope of the invention.

What is claimed is:

1. A method of making a fuel cell stack having at least two metallic members that are attached together, each of the metallic members having opposite major surfaces separated by a peripheral edge and at least one of the metallic members having an electrically conductive coating thereon, the method comprising:
   (a) positioning a first one of the metallic members adjacent a second one of the metallic members with one of said major surfaces of each of said metallic members facing one another, said first metallic member having a first electrically conductive coating thereon;
   (b) melting adjacent intermediate portions of said major surfaces of each of said adjacent metallic members and contemporaneously removing a portion of said first electrically conductive coating proximate to said melting portions of said adjacent metallic members, thereby resulting in at least one area on at least one of the major surfaces of said first metallic member where previously present first electrically-conductive coating has been removed, said intermediate portions being disposed between the associated peripheral edge; and
   (c) solidifying said melted portions of said adjacent metallic members thereby forming a fusion bond through said intermediate portions of said adjacent metallic members.

2. The method of claim 1, further comprising applying a second electrically conductive coating to at least a portion of said at least one area over said fusion bond.

3. The method of claim 1, wherein said melting and said removing are performed by applying focused radiation to said intermediate portions of said adjacent metallic members and said portion of said first electrically conductive coating.

4. The method of claim 3, wherein said melting and said removing are performed by contacting said intermediate portions of said adjacent metallic members and said portion of said first electrically conductive coating with a laser beam.

5. The method of claim 1, wherein said metallic members are plates that when attached together form a bipolar plate.

6. The method of claim 1, wherein said metallic members are stainless steel.

7. The method of claim 1, wherein said coating is an organic coating.

8. The method of claim 1, wherein said first electrically conductive coating has a resistivity of less than about 50 Ohm-$cm^2$.

9. A method of making a fuel cell stack having metallic bipolar plates with an internal flow passageway, the method comprising:
   (a) positioning a first metallic plate having opposite major surfaces and a peripheral edge and with at least a portion of one of said major surfaces coated with a first electrically conductive coating adjacent a second metallic plate having opposite major surfaces and a peripheral edge in an arrangement wherein one of said major surfaces of each of said first and second metallic plates face one another and said coated portion faces away from said second plate;
   (b) applying focused radiation to adjacent intermediate portions of said major surfaces of said adjacent plates including a portion of said first coating thereby removing said portion of said first coating and melting said adjacent intermediate portions of said adjacent plates resulting in at least one area on said first metallic plate where previously present first conductive coating has been removed;
   (c) removing said focused radiation;
   (d) allowing said melted portions to solidify and fuse together thereby forming a through weld and one of the bipolar plates; and
   (e) applying a second electrically conductive coating to at least a portion of said at least one area over said through weld.

10. The method of claim 9, wherein said second coating is a same type of coating as said first coating.

11. The method of claim 9, further comprising:
    applying said first coating to portions of a major surface of a sheet of metallic material; and
    forming said first plate from said coated sheet of metallic material.

12. The method of claim 11, wherein at least a portion of one of said major surfaces of said second plate is coated with said first coating and (a) includes positioning said second plate adjacent said first plate with said coated portion of said second plate facing away from said first plate and further comprising forming said second plate from said coated sheet of metallic material.

13. The method of claim 9, wherein:
    at least a portion of one of said major surfaces of said second plate is coated with a third electrically conductive coating;
    (a) includes positioning said second plate adjacent said first plate with said coated portion of said second plate facing away from said first plate; and
    (b) includes removing a portion of said third coating on said second plate with said fobused radiation resulting in at least one area on said second plate where previously present third coating has been removed.

14. The method of claim 13, further comprising applying a fourth electrically conductive coating to at least a portion of said at least one area on said second plate over said through weld opposite said second coating.

15. The method of claim 9, wherein said first coating is an organic coating.

16. The method of claim 9, wherein said plates are stainless steel plates.

17. The method of claim 9, wherein said first coating has a resitivity of less than about 50 Ohm-cm$^2$.

18. The method of claim 9, wherein said focused radiation is a laser beam.

19. The method of claim 9, wherein said plates are at least one of stainless steel, aluminum and alloys thereof, titanium and alloys thereof, nickel based alloys, tantalum, niobium, and zirconium.

20. A method of making a bipolar plate for a fuel cell stack, the method comprising:
   (a) applying an electrically conductive organic coating to a first metallic plate of the bipolar plate;
   (b) positioning said first plate adjacent a second metallic plate of the bipolar plate in a stacked arrangement wherein said first plate is on top of said second plate with peripheral edges of said first and second plates substantially aligned;
   (c) applying focused radiation to adjacent intermediate portions of said adjacent plates including a portion of said coating thereby removing said portion of said coating from at least one area of said first plate and melting said adjacent intermediate portions of said adjacent plates, said adjacent intermediate portions being located interiorly to said peripheral edges;
   (d) removing said focused radiation; and
   (e) allowing said melted portions to solidify and fuse together thereby forming a through weld and the bipolar plate.

21. The method of claim 20, wherein said coating is a first coating and further comprising applying a second electrically conductive coating to at least a portion of said at least one area of said first plate over said through weld.

22. The method of claim 20, wherein (a) includes:
   applying said coating to portions of a surface of a sheet of metallic material; and
   forming said first plate from said coated sheet of metallic material.

23. The method of claim 22, wherein at least a portion of one surface of said second plate is coated with said coating and (b) includes positioning said first plate adjacent said second plate with said coated surface of said second plate facing away from said first plate and further comprising forming said second plate from said coated sheet of metallic material.

24. The method of claim 20, wherein:
   at least a portion of one surface of said second plate is coated with said coating;
   (b) includes positioning said first plate adjacent said second plate with said coated surface of said second plate facing away from said first plate; and
   (c) includes removing a portion of said coating on said second plate with said focused radiation.

25. The method of claim 20, wherein said plates are stainless steel plates.

* * * * *